April 4, 1939.  W. INGALLS  2,153,373

DRAIN TRAP

Filed Nov. 23, 1938

INVENTOR.
WILLIAM INGALLS.
BY Lockwood, Goldsmith & Galt,
ATTORNEYS.

Patented Apr. 4, 1939

2,153,373

UNITED STATES PATENT OFFICE 2,153,373

DRAIN TRAP

William Ingalls, Bedford, Ind.

Application November 23, 1938, Serial No. 241,904

6 Claims. (Cl. 182—8)

This invention relates to a drain trap which is particularly adapted for ice boxes for household and commercial uses but is useful for other purposes as well.

One object of the invention is to provide a trap which permits effective drainage but which prevents return of gases carrying undesirable odors and which is so constructed that it may be periodically cleaned with the least amount of time and effort.

In the use of drainage traps for household ice boxes the water from the melting ice often carries solid substances which accumulate in the trap and eventually clog the same sufficiently to prevent adequate drainage. For that reason it is necessary that the trap be periodically removed and thoroughly cleaned. The traps heretofore in use are generally situated at the rear of the ice box structure and are so constructed that the drain pipe must be dismantled when the trap is removed for cleaning. The labor involved is extremely difficult for the housewife to perform.

The present invention provides a trap which may be removed and replaced as easily as any tray or drawer but which, when in place, provides adequate drainage and an effective seal against entrance of odor-carrying air or gas.

Figure 1:
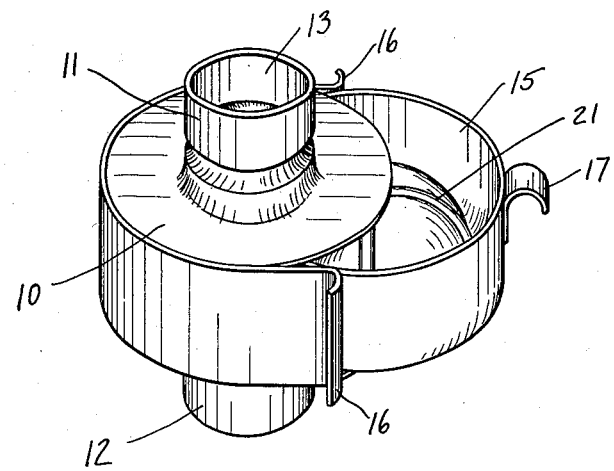
Figure 2:
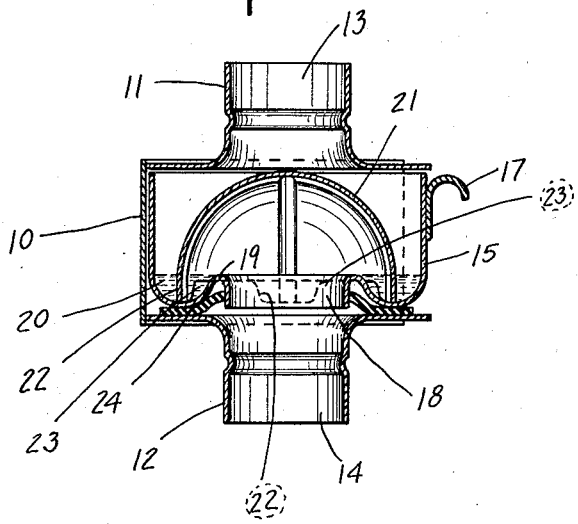

Other objects and features of the invention will be understood from the accompanying drawing and the following description and claims:

Fig. 1 is a perspective view in which the trap receptacle is shown partly removed. Fig. 2 is a central sectional view.

In the preferred form of the invention as shown in the drawing, there is provided a housing 10 preferably of a substantially cylindrical form and having an upper extension 11 and a lower extension 12 defining respectively an inlet opening 13 and an outlet opening 14. The extensions 11 and 12 are shaped to be attached to any suitable pipes for conducting drainage to and from the trap. The housing 10 also has an opening at one side through which a cup-like receptacle 15 may be inserted. The walls of the housing 10 are curved as seen at 16 and are formed of resilient material to engage the receptacle 15 with a spring pressure for retaining the same within the housing.

The receptacle 15 is fitted with a handle 17 to facilitate removal and is formed with a central opening 18 registering with the outlet opening 14 of the casing. The opening 18 is surrounded by an upraised convolution 19 in the bottom of the receptacle 15 and said convolution defines an annular trough 20 in which drainage water may collect to the level of the upper edge of the convolution 19. The opening 18 is covered by a cap 21 having downwardly extending legs 22 seated in the trough 20. Between the legs 20 there are formed recesses 23, located entirely below the level of the water in the trough 20.

In the use of the invention, the drainage from an ice chamber, or from any other source, is received through the inlet opening 13 and is deflected by the cap 21 into the trough 20. Said drainage, except for that normally retained in the trough, passes through the openings 23, between the legs 22 and thence over the convolution 19 to the outlet openings 18 and 14. Obviously, the water retained in the trough 20 forms a water seal which prevents the return of air or other gases upwardly through the outlet openings to the interior of the trap. Beneath the receptacle 15 there is also provided a sealing means preferably in the form of a rubber gasket 24 which lies between the bottom of said receptacle and the bottom of the housing 10. This sealing means effectively prevents the passage of air from the outlet opening 14 around the sides of the receptacle 15.

When the trap becomes fouled by accumulations within the trough 20, the receptacle 15 may be removed, thoroughly cleaned and replaced in a very few minutes. No dismantling of the piping system is necessary and no tools of any kind are required.

The foregoing specification describes the invention in its present preferred form. Obviously the details thereof may be varied without departing from the scope of the invention as defined by the appended claims.

The invention claimed is:

1. A drain trap including a housing having an inlet opening at the top, an outlet opening at the bottom and an opening at one side, a receptacle insertable in said housing through said side opening and positioned when so inserted to receive drainage from said inlet opening, said receptacle having an outlet opening in the bottom thereof communicating with the outlet opening of said housing, and means in said receptacle adapted to form a water seal permitting flow of drainage through said outlet openings but preventing return movement of gases.

2. A drain trap including a housing having an inlet opening at the top, an outlet opening at the bottom and an opening at one side, a receptacle insertable in said housing through said side opening and positioned when so inserted to receive drainage from said inlet opening, said receptacle having an outlet opening in the bottom thereof communicating with the outlet opening in said housing, means in said receptacle adapted to form a water seal permitting flow of drainage through said outlet openings but preventing return movement of gases, and sealing means between said receptacle and housing preventing flow of gases from said outlet openings about said receptacle.

3. A drain trap including a housing having an inlet opening at the top, an outlet opening at the bottom and an opening at one side, a receptacle insertable in said housing through said side openings and positioned when so inserted to receive drainage from said inlet opening, said receptacle having an outlet opening in the bottom thereof communicating with the outlet opening of said housing, said receptacle having an upraised convolution about its outlet opening and forming an annular trough thereabout, said trough being adapted to retain a supply of water at the level of the top of said convolution, and a cap seated in said trough and covering said outlet opening, said cap having passageways beneath the water level in said trough for passage of drainage to said outlet opening.

4. A drain trap including a housing having an inlet opening at the top, an outlet opening at the bottom and an opening at one side, a receptacle insertable in said housing through said side openings and positioned when so inserted to receive drainage from said inlet opening, said receptacle having an outlet opening in the bottom thereof communicating with the outlet opening of said housing, said receptacle having an upraised convolution about its outlet opening and forming an annular trough thereabout, said trough being adapted to retain a supply of water at the level of the top of said convolution, a cap seated in said trough and covering said outlet opening, said cap having passageways beneath the water level in said trough for passage of drainage to said outlet opening, and sealing means between said receptacle and housing preventing flow of gases from said outlet openings about said receptacle.

5. A drain trap including a housing having an inlet opening at the top, an outlet opening at the bottom and an opening at one side, a receptacle insertable in said housing through said side opening and positioned when so inserted to receive drainage from said inlet opening, said receptacle having an outlet opening in the bottom thereof communicating with the outlet opening of said housing, means in said receptacle adapted to form a water seal permitting flow of drainage through said outlet openings but preventing return movement of gases, and resilient means normally retaining said receptacle in said housing.

6. A drain trap including a housing having an inlet opening at the top, an outlet opening at the bottom and an opening at one side, a receptacle insertable in said housing through said side openings and positioned when so inserted to receive drainage from said inlet opening, said receptacle having an outlet opening in the bottom thereof communicating with the outlet opening of said housing, said receptacle having an upraised convolution about its outlet opening and forming an annular trough thereabout, said trough being adapted to retain a supply of water at the level of the top of said convolution, a cap seated in said trough and covering said outlet opening, said cap having passageways beneath the water level in said trough for passage of drainage to said outlet opening, and resilient means normally retaining said receptacle in said housing.

WILLIAM INGALLS.